No. 860,001. PATENTED JULY 16, 1907.
R. D. WHITE.
SHIP'S TELEGRAPHY.
APPLICATION FILED AUG. 2, 1906.

6 SHEETS—SHEET 2.

Witnesses
Geo. A. Byrne
Myron G. Clear

Inventor
R. D. White
by Wilkinson & Fisher
Attorneys.

No. 860,001. PATENTED JULY 16, 1907.
R. D. WHITE.
SHIP'S TELEGRAPHY.
APPLICATION FILED AUG. 2, 1906.

Figure 4:
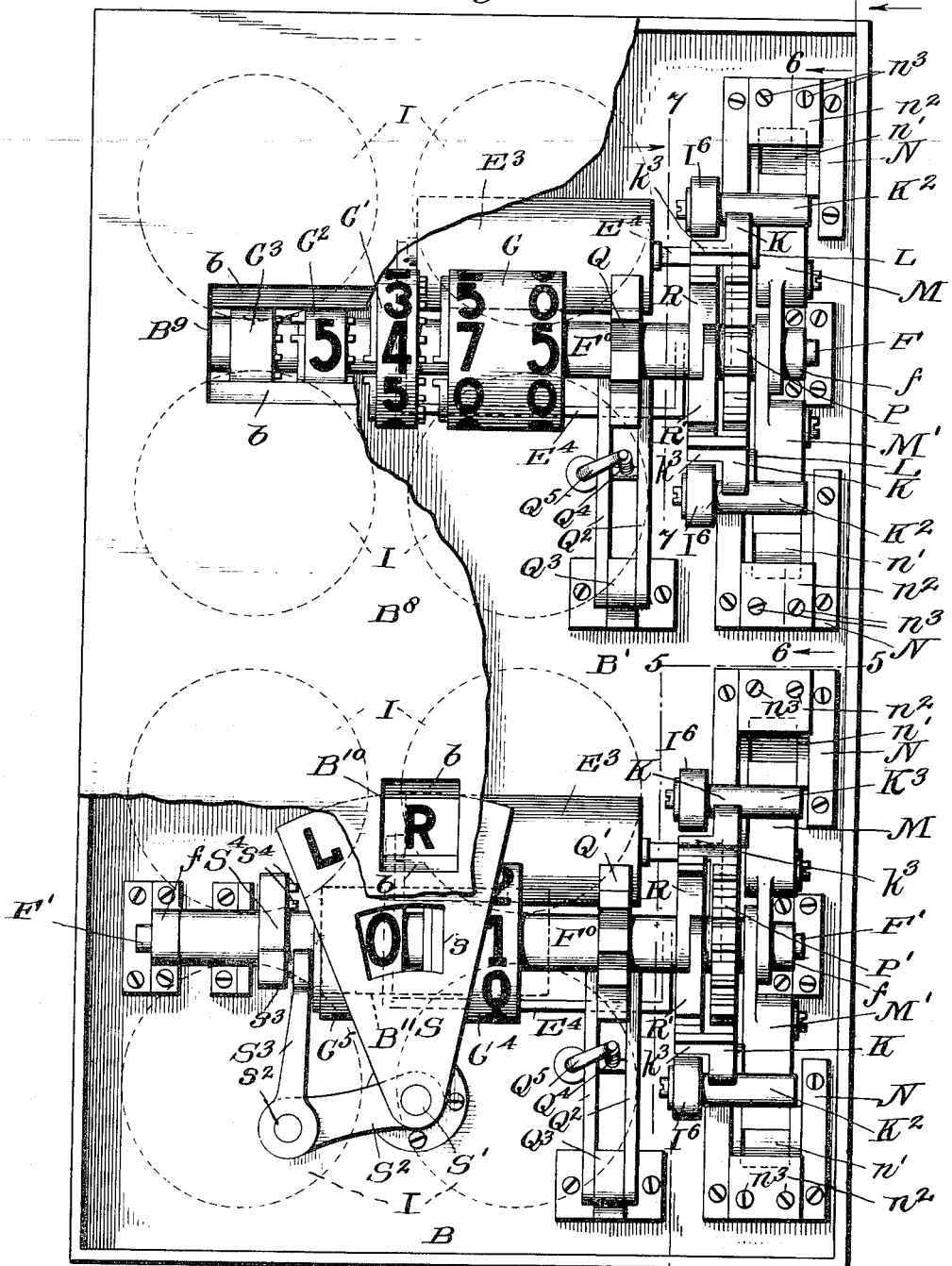

Fig. 4. 6 SHEETS—SHEET 3.

No. 860,001. PATENTED JULY 16, 1907.
R. D. WHITE.
SHIP'S TELEGRAPHY.
APPLICATION FILED AUG. 2, 1906.

6 SHEETS—SHEET 4.

Witnesses
Geo. A. Byrne
Myron G. Clear

Inventor
R. D. White
by Wilkinson & Fisher
Attorneys.

No. 860,001. PATENTED JULY 16, 1907.
R. D. WHITE.
SHIP'S TELEGRAPHY.
APPLICATION FILED AUG. 2, 1906.
6 SHEETS—SHEET 5.
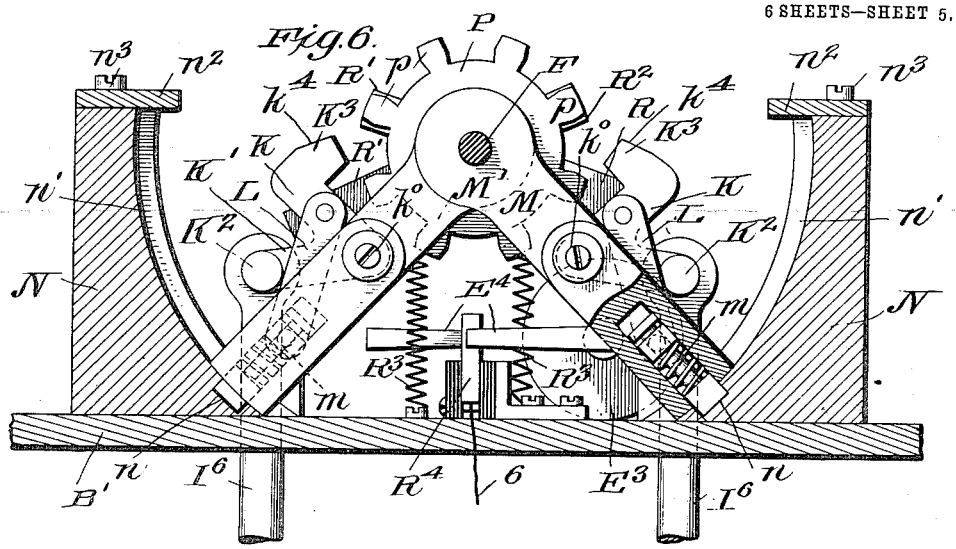
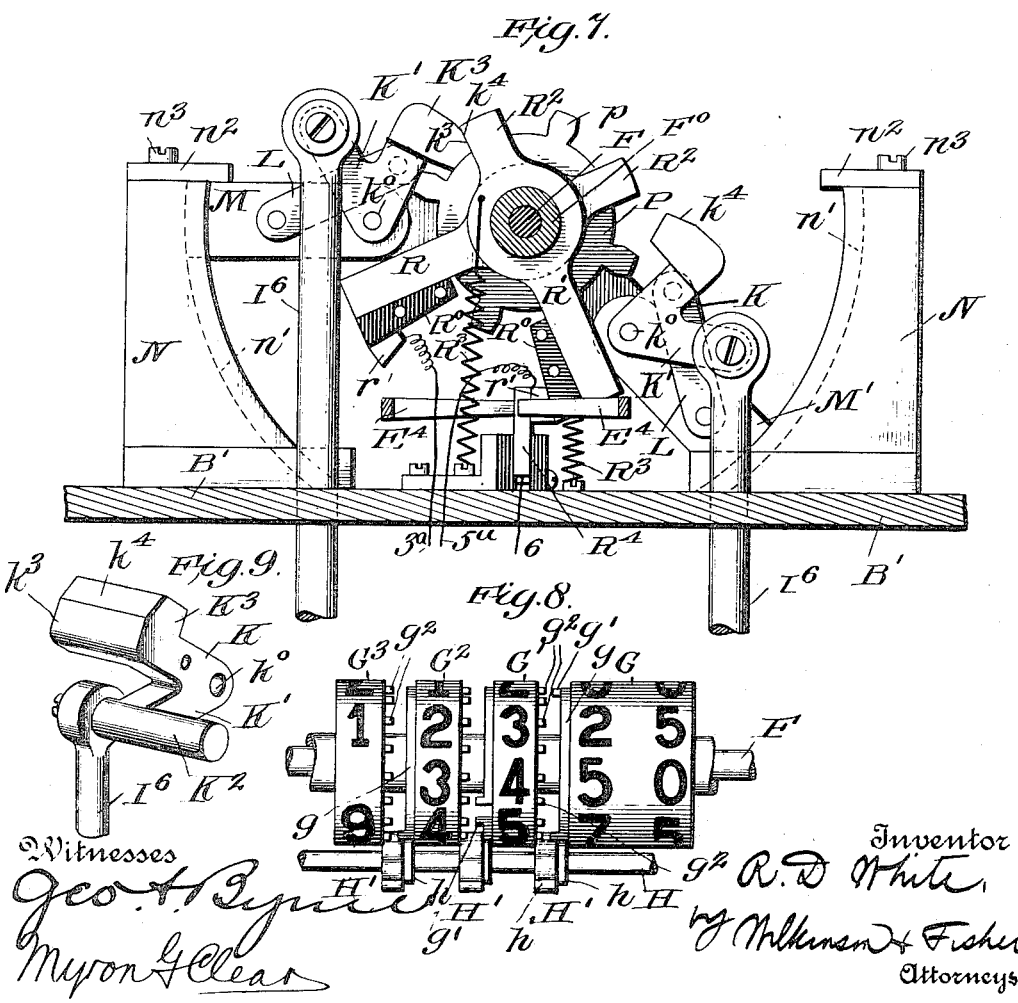

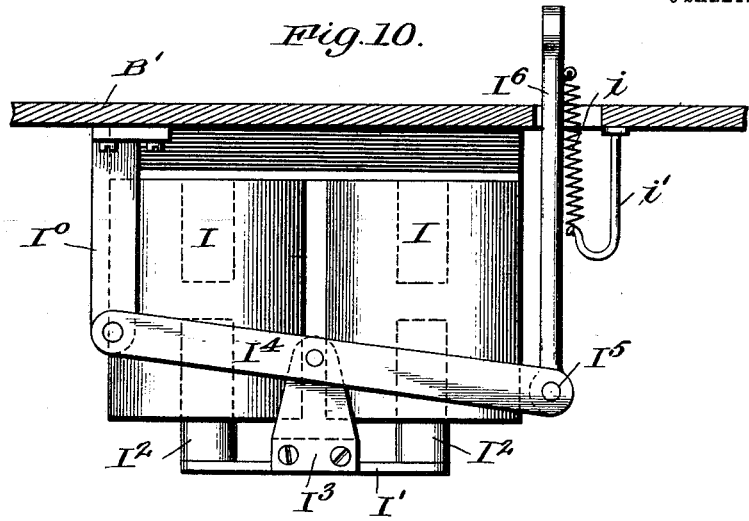
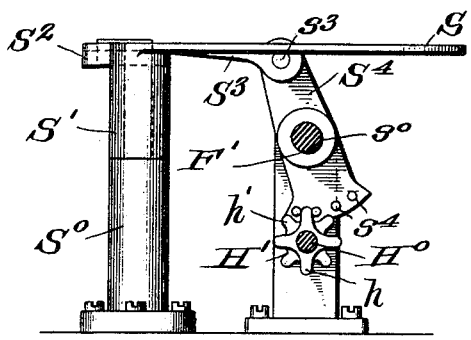
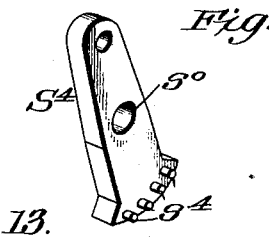
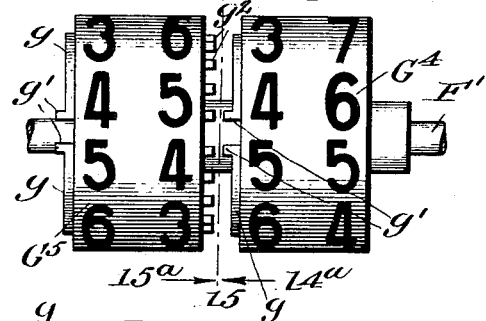
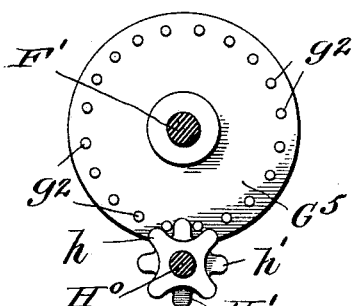
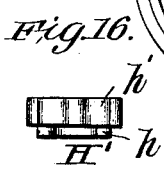
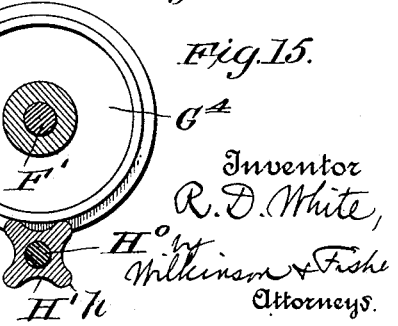

UNITED STATES PATENT OFFICE.

RICHARD D. WHITE, OF WASHINGTON, DISTRICT OF COLUMBIA.

SHIP'S TELEGRAPHY.

No. 860,001.　　　Specification of Letters Patent.　　Patented July 16, 1907.

Application filed August 2, 1906. Serial No. 328,956.

*To all whom it may concern:*

Be it known that I, RICHARD D. WHITE, a citizen of the United States, residing at Washington, in the District of Columbia, have invented certain new and useful Improvements in Ship's Telegraphy; and I do hereby declare the following to be a full, clear, and exact description of the invention, such as will enable others skilled in the art to which it appertains to make and use the same.

My present invention relates to improvements in ship's telegraphy, and is intended more especially to provide means operable from a central station, whereby a single operator can telegraph to a number of guns' crews details as to ranges and deflections, to provide for which the sights should be set and in which the signal to each particular gun shall be repeated at the central station.

My invention further provides for signaling with a single instrument to groups of guns and having the signals repeated, as already stated, and also for having these groups specially divided into minor groups, to each of which minor groups separate signals may be sent; thus for instance with the after guns, it may be desired to aim at one target, with the midship guns it may be desired to aim at another target, while with the bow guns it may be desired to aim at a third target, and according to my invention all of this can be accomplished by slight modifications in the apparatus designed for signaling simultaneously to all of the guns.

My invention comprises in brief a central station, with one or more sending instruments adapted to signal to the various guns, either singly or in groups, as may be desired, and also provided with a series of repeating instruments which repeat the signals sent to the various guns. There is one of these instruments for each gun station signaled to. At the gun station, there should be a receiving instrument corresponding to the repeating instrument at the central station, and these various instruments at the gun station and at the central station are connected together by a simple series of circuits which will be hereinafter described.

Reference is had to the accompanying drawings, in which the same parts are indicated by the same letters and numerals throughout the several views.

Figure 1:
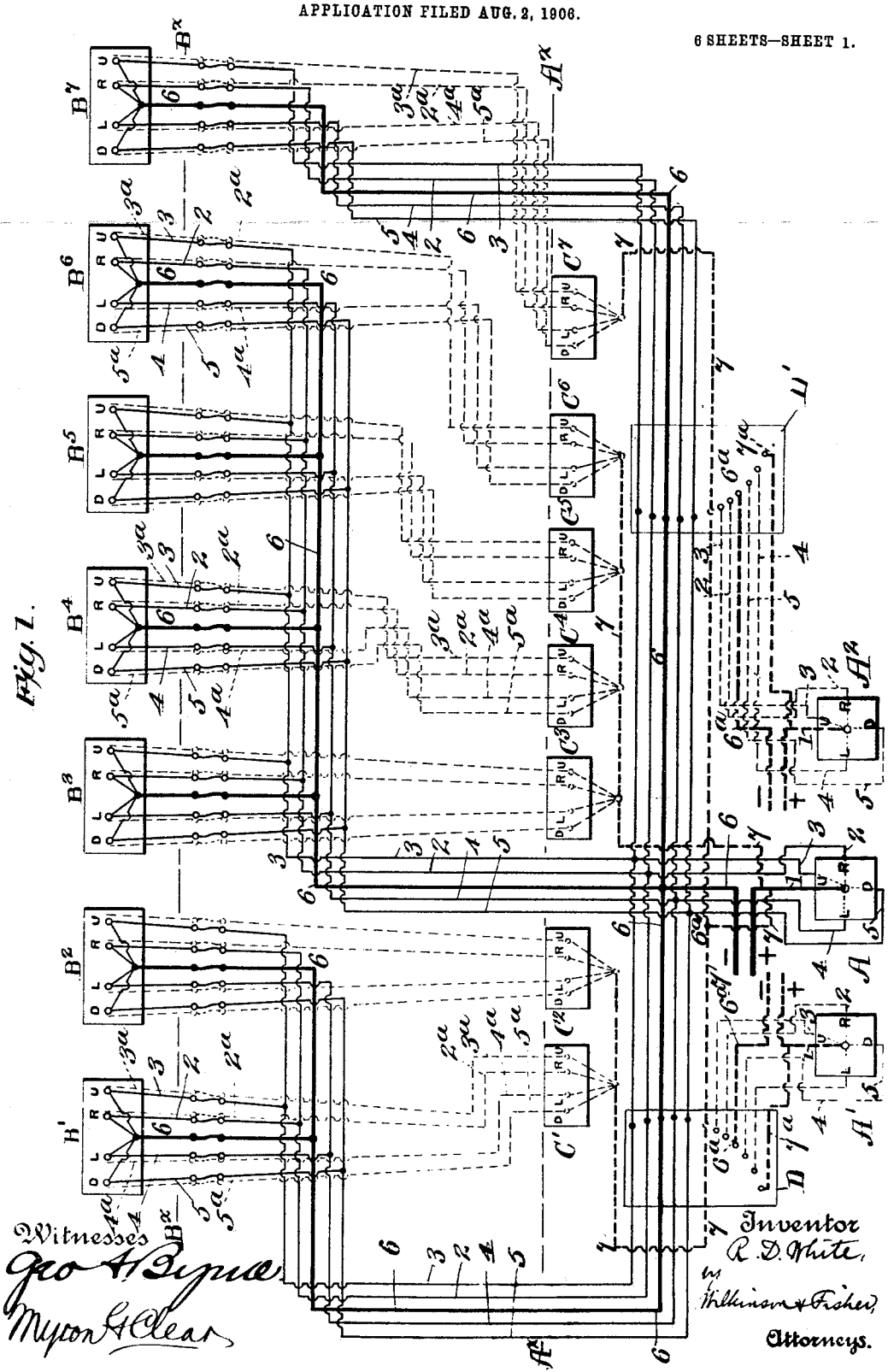
Figure 2:
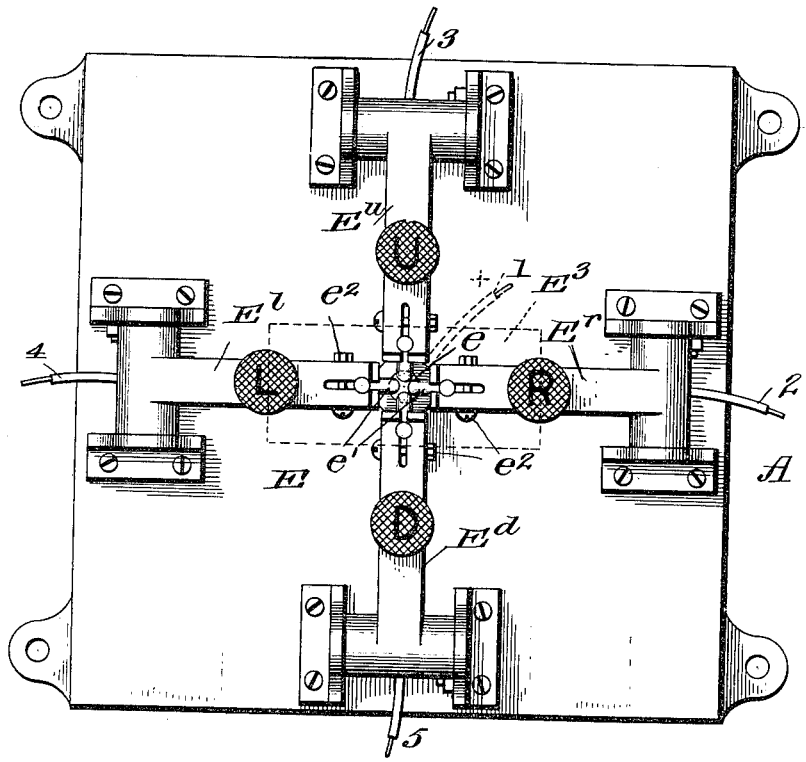
Figure 3:
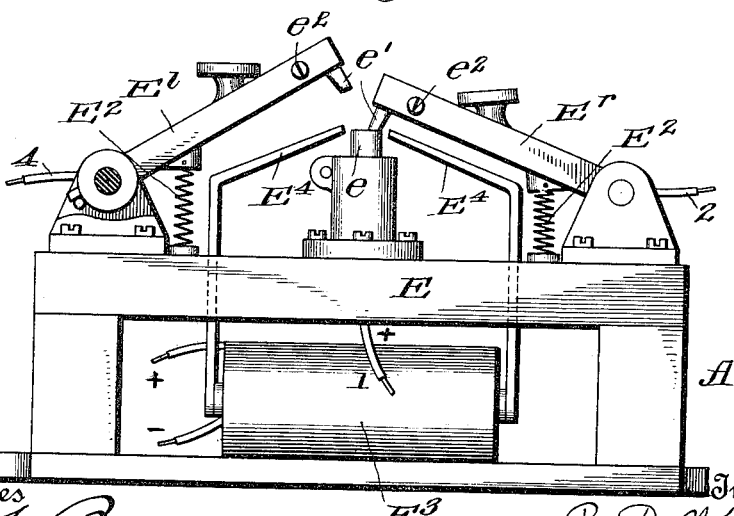
Figure 5:
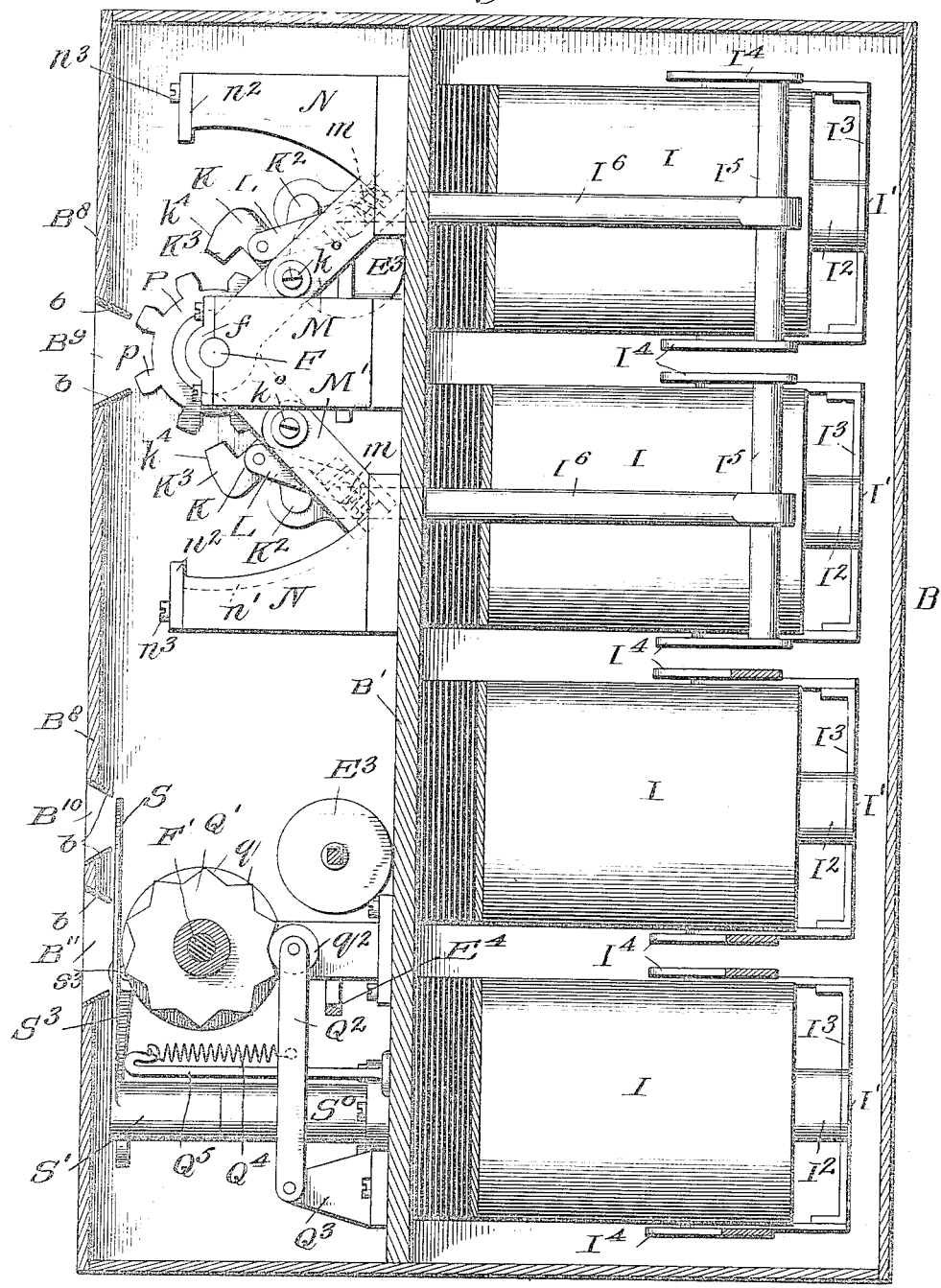

Figure 1 shows a diagram of the electric circuits connected to the central station and to the gun stations, and represents three sending instruments and seven receiving instruments, and also seven repeating instruments. Fig. 2 is a plan view of the apparatus at one of the sending instruments. Fig. 3 is an end view of the apparatus shown in Fig. 2, except that two of the sending keys are omitted for the sake of clearness in the drawings. Fig. 4 shows a front view of the outside of the case containing the receiving instrument at the gun, parts of the cover of said case being broken away to show the interior mechanism.
Fig. 5 shows a section along the broken line 5—5 of Fig. 4 and looking in the direction of the arrows. Fig. 6 shows a section along the broken line 6—6 of Fig. 4 and looking in the direction of the arrows, the parts being shown in the inoperative position. Fig. 7 shows a section along the line 7—7 of Fig. 4, looking in the direction of the arrows. This figure shows the opposite side from that indicated in Fig. 6 and with the parts in the operative position. Fig. 8 is a detail showing in side elevation the counter disks, and illustrating the engagement of the star wheels therewith. Fig. 9 is a perspective view of one of the bell crank pawls. Fig. 10 shows a side elevation of one of the operating magnets in the inert position. Fig. 11 shows in side elevation the apparatus for operating the shutter for indicating left and right deviations. Fig. 12 is a detail, showing in perspective the toothed segment or rocker for operating the shutter. Fig. 13 is a detail of the disks for indicating lateral deflections. Figs. 14 and 15 show sections seen in reversed directions along the line 14—15 of Fig. 13, looking in the direction of the arrows $14^a$—$14^a$ and $15^a$—$15^a$, respectively, and Fig. 16 is a detail, showing in plan one of the double star wheels illustrated in Figs. 8 and 14.

In the drawings, Fig. 1 illustrates diagrammatically the electric connections, while Figs. 2 and 3 illustrate one of the sending instruments, and the other figures illustrate either the receiving or the repeating instrument, the apparatus at the gun station and the repeating apparatus at the central station being substantially identical except for minor differences which will be hereinafter brought out.

Referring first to Fig. 1 which shows a diagram of all the electrical connections, the parts at the central station are all indicated below the dash line $A^x$—$A^x$. The parts at the gun stations are all indicated above the dash line $B^x$—$B^x$, while the parts between those lines are included in the conducting cables which are carried in iron pipes throughout the ship, preferably below the protected deck, or in any well protected position. To describe these diagrams in detail, A represents one of the sending instruments at the central station which is shown as coupled up to seven receiving instruments indicated by $B^1$, $B^2$ . . . $B^7$. At At the central station are shown two other sending instruments $A'$ and $A^2$, the first of which may be connected by the switch D to two receiving instruments $B'$ and $B^2$, and the sending instrument $A^2$ may be connected by the switch $D'$ to the single receiving instrument $B^7$. It will thus be seen that a single sending instrument A may be connected to all seven of the gun stations, and that two of these receiving instruments may be cut off and connected to the instrument $A'$, and one of these receiving instruments may be cut off and connected to the sending instrument $A^2$. This is merely a typical arrangement and may be varied to suit the variations in the number and location of the guns to be signaled to. Each receiving instrument is connected to a repeating instrument at the central station, so that the operator at the central station may be informed as to whether his signal has been received or not. Since the circuits from the central station to all the receiving stations are similar, it will only be necessary to trace the circuit from one sending station to one receiving station and thence to one repeating station, and thence back to the ship's mains. Thus suppose the switch at the sending station be closed, as indicated at the letter U in the instrument A at the sending station, the positive main being normally connected to the wire 1. The current will then flow from the wire 1 through the instrument to the wire 3, and following this wire will reach the corresponding electro magnet represented at U, and thence it will flow back through the common return main 6 to the negative ship's main. This will actuate the receiving instrument, as will be hereinafter more fully described. The repeating instrument is simultaneously operated by a current which flows from the positive ship's main through the common feed wire 7, indicated in heavy dotted lines, through the electro magnet, indicated by U in the repeating instrument, and then up to the switch in the receiving instrument, which was caused to be closed by the current from the sending instrument, as will be hereinafter described. The current, after passing through the repeating instrument and arriving at the receiving instrument, returns to the common return conductor 6, and flows back with the original signaling current to the negative ship's main. The mechanical details for effecting the closing of these circuits will now be described.
Referring to Figs. 2 and 3, these show any one of a series of sending instruments such, for instance, as are indicated at A, A', A², in Fig. 2. These sending instruments consist primarily of an insulating platform E carrying an electric contact $e$ connected by the conductor 1 to the positive ship's main. There are a plurality of keys, indicated at $E^d$, $E^r$, $E^u$, $E^l$, which keys carry insulated buttons bearing the letters D, R, U, and L, representing respectively, the down, right, up, and left positions. These keys carry contact points $e'$, which are preferably made of platinum, and are detachably connected by means of the screws $e^2$. These keys are normally held out of contact with the contact piece $e$ by means of suitable springs $E^2$. Each of these keys is electrically connected to one of the wires 2, 3, 4, 5, indicated diagrammatically in Fig. 1, and pressing down the said key will close the circuits from the positive to the negative ship's main through the sending and through the receiving instrument, and will cause the circuit to be completed through the repeating instrument, as will be hereinafter described. In order to lessen the damage due to sparking, a magnetic blow-out is provided, which comprises two magnetic arms $E^4$, terminating a short distance from the contact $e$, and which arms are connected to the magnetic core of the electro magnet $E^3$, and are thus magnetized thereby. It will be seen that when the key is released, the spring $E^2$ will restore it to the initial position, and the spark which would tend to follow the breaking of the contacts, will be blown out by the magnetic device, just described.

It will be noted that the conductor 2 from the sending instrument leads to the magnets at R of the receiving instrument, and is thence connected to the common return 6, while the conductor 3 leads from the sending instrument to the magnets at U of the receiving instrument, and thence to the common return 6. In the same way the conductor 4 from the sending instrument is connected to the receiving instrument and thence to the common return, and the wire 5 from the sending instrument is connected to the receiving instrument and thence to the common return. The circuits from each receiving instrument to its corresponding repeating instrument are also all similar, so that the system is capable of expansion and contraction indefinitely.

While in Fig. 1 all of the receiving instruments are shown as connected to a single sending instrument A, the two receiving instruments B' and B² may be cut off from the sending instrument and connected to the sending instrument A' by means of the multipole switch indicated by the square D. The shifting of this switch would cause the common return 6 to connect with a similar return conductor $6^a$, shown in heavy dotted lines, while the feed wire 7 would make contact with the wire $7^a$.

The details of the switch are not shown, as any well known two-way switch may be adopted. In a similar way, the receiving instrument $B^7$ may be cut off from the sending instrument A and connected to the sending instrument A² by shifting the switch indicated by the square at D'.

I have thus described the general arrangement of the circuit and the details of the sending instrument, and will now proceed to describe the mechanical details of the receiving instrument and also of the repeating instrument, with special reference to their responding to the signal transmitted from the sending instrument.

B represents a box or case which is divided by a partition B', (see Fig. 5), into two compartments, one holding the operating magnets and the other holding the indicating mechanism operated by said magnets, together with the other coöperating parts. The front cover $B^8$ of the case is slotted as at $B^9$, $B^{10}$, and $B^{11}$ to register with one or more figures of the indicating disks, and these slots are preferably faced with strips $b$ to limit the surface of the indicating disks exposed to the eye of the observer.

F and F' are two fixed shafts which run across the box B which are supported by the brackets $f$, as indicated most clearly in Figs. 4 and 5. The upper shaft F has loosely mounted thereon the series of disks for indicating the range, together with various other parts hereinafter to be described, while the lower shaft F' has loosely mounted thereon the two disks for indicating lateral deviations, together with certain other mechanism hereinafter to be described.

Referring first to the mechanism for indicating ranges, G, G', G², G³ represent a series of disks which are numbered to correspond to units, hundreds, thousands, and tens of thousands of yards or meters, and are geared together by double star wheels H' that will be hereinafter described. The first disk G is indicated as graduated to multiples of twenty-five, corresponding to twenty-five, fifty, and seventy-five yards. The second disk G', as also the disks G² and G³, are provided with a single tier of graduations to represent hundreds, thousands, and tens of thousands of yards, as hereinbefore stated. The disks G, G' and G² are provided with laterally projecting ribs g, shown in Fig. 8, which are precisely similar to the ribs g on the disks G⁴ and G⁵, which are used for indicating lateral deviations and which are illustrated in Figs. 13 and 15.

Since the star wheels and the indicating disks are geared together in precisely the same way in either the range indicator or the lateral deviation indicator, reference may be had to either Fig. 8 or to Figs. 13 to 16 in describing the transmission of motion from one disk to another.

The star wheels H' for the range indicator are mounted on the shaft H, while the star wheels for the lateral deviation indicator are mounted on the shaft H⁰. These star wheels each carry two sets of teeth h and h', the teeth h being narrower and being one-half the number of the wider teeth h', as shown in Figs. 8 and 16.

The rib g fast to each disk is broken in one or more places between the teeth g' which project outward from the said rib, as shown in Figs. 8 and 13. The narrower teeth h of the star wheel slide along the periphery of the rib g, as shown in Fig. 15, until the wider teeth h' project into the opening between the two teeth g', and then the star wheel forms a positive connection between the teeth g', projecting from the rib g, and the teeth g² on the opposite disk, and thus the star wheel locks the two disks together; and if the right hand disk is turned still further, the next disk to the left will be rotated through one tooth before the star wheel gets out of engagement with the teeth g'.

By having the number of breaks between the teeth g' only one to each disk, as indicated in Fig. 15, the second disk will only be moved once during each complete revolution of the first disk, while by having two breaks in the first disk as indicated in Fig. 8, the next succeeding wheel will be turned through a small angle twice during each revolution of the first wheel in the series.

It will be obvious that the speed of the succeeding wheels may be increased or decreased by varying the number of breaks, as described.

Motion is transmitted to the first wheel of each series by means of the magnets I, as will be now described.

The feed mechanism is the same for both the range indicator and the lateral error indicator, and comprises two armatures I' for each indicator, each armature carrying two magnetic cores I⁰ which project into the electro-magnets I, as shown in Fig. 10. Each armature I' is connected by a bracket I³ to a pair of levers I⁴ pivoted to the hangers I⁰, which levers are connected at their opposite ends by the cross head I⁵, to which is pivoted the link I⁶. This link is normally pulled backwards under slight tension, by means of the spring i connected to the hook i', see Fig. 10. The head of the link I⁶ is connected to a bell crank pawl K, shown in detail in Fig. 9, which bell crank is pivoted as at k⁰ to one of the arms M or M', hereinafter to be described. The arm K' of the bell crank carries a laterally projecting stud K², while the opposite arm carries the pawl K³ having the inclined face k⁴ and the laterally projecting lug k⁵.

L represents a link which connects the bell crank K with the spring latch m which is mounted in a socket in an arm pivoted on the shaft F and engages in a notch n in the block N. There are two of these spring latches, each mounted in one of the arms M or M' which are generally similar, except that one arm is put into engagement in rocking the indicator disks in one direction, while the other arm rocks the indicator disks in the opposite direction. The parts being symmetrical, it will only be necessary to describe one of these arms and the parts carried thereby. The block N is provided with a notch n and also with the arc-shaped groove n', which groove receives the curved end of the arm M or M', and the travel of the said arm is limited by the stop n² secured in place by the screws n³.

When one of the two pairs of magnets I are energized, say for instance the upper pair, as indicated in Figs. 4 and 5, the armature I' will be moved, moving the link I⁶ and rocking the bell crank K about its pivot k⁰. The first rocking motion of the bell crank will cause the link L to withdraw the spring catch m clear of the notch n and at the same time, the pawl K³ will project in between two of the teeth p of the wheel P. The further movement of the link I⁶ will cause the bell crank to swing the arm M' upwards about the shaft F until the said arm strikes the stop n². This swinging of the arm M' will cause the pawl to rotate the wheel P through a predetermined angular distance, until the parts are in the position shown in Fig. 7. The parts will remain in this position as long as the pair of magnets is energized, but the moment the current is cut off from the magnets, the spring i will restore the link I⁶ to the initial position, bringing back the pawl and the arms supporting the same to the original or inoperative position, as indicated in Fig. 6, at which time the spring catch m will spring into engagement with the notch n, and the parts will be locked as before.

It will be obvious that the wheel P may be moved to the right or left, according to which one of the two links I⁶ is moved upwards under the influence of the corresponding pair of electro-magnets, and thus the train of indicating disks may be moved backwards or forwards, according to which key is pressed upon.

It will be obvious that the operation of moving the indicating disks may be repeated indefinitely by simply pressing down on the key.

In order to prevent back lash or lost motion of the train of indicating disks, I provide a friction lock which will now be described.

There is a notched wheel Q for the range indicator and a similar wheel Q' for the lateral deviation indicator, the only difference between the two wheels being that one has more teeth than the other, for reasons which will be hereinafter described. Engaging in the notches between the teeth q of these wheels, see Fig. 5, is a roller q² carried by the double lever Q² pivoted to the bracket Q³. This roller is normally pressed into engagement with the wheel by means of the spring Q⁴ attached to the hook Q⁵. It will thus be seen that this furnishes a friction brake which will lock the wheel against all normal vibrations, such as the firing of heavy ordnance, the scend in a sea-way, etc., but it will permit the wheel to be readily turned by means of the electro-magnets hereinbefore described.

The wheels P and Q and the first disk of the indicating series are all mounted fast on a sleeve F⁰, which fits loosely on a corresponding shaft F or F′, as the case may be.

Thus I have described how pressing the key at the sending station will cause the indicating apparatus to operate at the receiving station.

I will now describe how the motion of the parts at the receiving station is repeated back at the central station on the repeating instrument.

There are two arms R and R′ loosely mounted on the sleeve F⁰, which arms are normally held in the initial or inoperative position by means of the springs R³. Each of these arms carries an insulating block R⁹ with a contact piece r′, the two contacting pieces being connected to the conductors 3ª and 5ª, respectively, as shown in Fig. 7, and as indicated diagrammatically in Fig. 1. When the pawls K³ are in the inoperative position, as shown in Fig. 6, these contacts r′ are out of engagement, but when the pawl is swung into the engaging position, the inclined face k⁴ on the lug k³ will engage the upper extension R² on the corresponding arm and will rock this arm about the sleeve F⁰, bringing the contact r′ into engagement with the contact piece R⁴ connected to the return conductor 6. This will complete the circuit from the common feed 7 through the repeating instrument and the wire 5ᵉ to the contact r′, and thence through the contact R⁴ to the common return conductor 6. Thus it will be seen that the same motion of one of the arms M M′ that rocks the wheel P and the train of indicator disks, will also automatically close the circuit through the repeating instrument.

To blow out the spark which would otherwise be occasioned when the contact at r′ is broken, a magnetic blow-out is provided, comprising the magnetic arms E⁴ and an electro-magnet E³, as already described in detail in connection with Figs. 2 and 3.

The parts for operating the indicator disks either for the range indication or for lateral deviation are substantially identical, except that I prefer to have the disks for the range indicator moved at a different angular speed from that of the lateral error indicator. In other words I provide eight notches between the teeth of the wheel P and also between the teeth of the wheel q, and ten notches between the teeth of the wheels P′ and Q′, but this is a mere matter of detail and has nothing whatever to do with the principle upon which the apparatus operates.

In indicating lateral deviation, it will not be necessary to have the long train of indicating disks that are used in the range indicator, and two disks bearing double columns of figures will be sufficient for all practical purposes. I have shown two of such disks in Figs. 4 and 13, which disks G⁴ and G⁵ are connected together by the star wheel H′, as before described. The second disk G⁵ is connected to a toothed sector S⁴ having teeth s⁴, which sector is pivoted as at s⁰ on the shaft F′. The sector is used instead of an entire wheel merely because limited rocking movement only is required. This segment S⁴ at its opposite end is pivoted as at s³ to the arm S³ which is pivoted as at s² to the arm S², which is fast to the sleeve S′ carrying the shutter S. This sleeve is mounted on the spindle S⁰.

The shutter S has a port s adapted to show therethrough one number only borne by one or the other of the indicator disks G⁴ and G⁵, a second number being exposed outside the shutter. This shutter has also printed conspicuously thereon the letters L and R, one of which only can be seen through the opening B¹⁰ in the face plate B⁸ of the box B. This shutter is so adjusted that when either of the disks G⁴ or G⁵ is moved to a predetermined position with regard to the zero mark, then the shutter will be automatically shifted through the operation of the star wheel H′. In other words when the right zero borne by the disk G⁵ passes the port, the pins g′ on the left face of the disk engage with and turn the star wheel H′, causing the shutter to automatically shift its position, as hereinbefore described. Thus when the error to be compensated for is to the right, the letter R appears, and vice-versa, when the error is to the left.

It will be obvious that the graduations on the various disks may be varied at will and that the relative speeds of the various disks may be regulated by substituting other disks having different arrangements of teeth.

It will be noted that in the repeating instrument, there is no necessity for the contact makers indicated at R R′ in Figs. 4 and 7. Therefore these will be omitted from the repeating instrument.

It will be obvious that means might be provided for setting the various disks by hand to any desired initial range, but since this would necessitate a corresponding change in the repeating instrument, which might be overlooked, I prefer that the apparatus shall be operated entirely by electricity. By repeatedly pressing down a key in rapid succession, the instrument may be quickly set at any range however great, and the motion of the disks for indicating lateral deviation being comparatively limited, these could be quickly set, so that there is really no necessity for setting the disks by hand, and it would avoid possible confusion, and errors, in gun fire, if the apparatus be ranged to respond only to the operation of the electro magnets.

Having once set the instrument to indicate the range and the lateral deviation with regard to any given target, the changes in the indicating disks, while the guns are being fired at that target, would ordinarily be taken care of by an occasional manipulation of the keys at the sending station.

While, for convenience of description, I have called the apparatus "Improvements in ship's telegraphy", it will be obvious that it may be used in various other relations where it is desired to transmit a signal from a central to a distant station and have the same repeated at the central station.

It will be obvious that various modification in the arrangement of circuits and in the details of the apparatus, and in the combination and arrangement of parts may be made without departing from the spirit of my invention.

I claim broadly as my invention:—

1. In a ship's telegraph system, the combination of a sending instrument adapted to close any one of a plurality of electric circuits, of a receiving instrument responding to said sending instrument, and a repeating instrument automatically operated by the said receiving instrument independently of the sending instrument, substantially as described.

2. In a ship's telegraph system, the combination of a sending instrument adapted to close any one of a series of electric circuits, a group of receiving instruments simultaneously operated by the circuits from said sending instrument, and a repeating instrument for each receiving instrument automatically operated by said receiving instrument independently of the sending instrument, substantially as described.

3. In a ship's telegraph system, the combination with a plurality of sending instruments, of a plurality of receiving instruments, electric circuits connecting said sending instruments to said receiving instruments either singly or in groups, and a series of repeating instruments coupled up to their respective receiving instruments and automatically operated thereby, substantially as described.

4. In a ship's telegraph system, the combination with a sending instrument provided with a keyboard, of a plurality of receiving instruments provided with electro magnets and indicating mechanism controlled by said magnets, electric conductors connecting said sending instrument with said receiving instruments, and a repeating instrument for each receiving instrument and automatically operated by said electro magnets simultaneously with said indicating mechanism at the receiving instrument, substantially as described.

5. In a ship's telegraph system, the combination with a sending instrument provided with a keyboard, of a plurality of receiving instruments provided with electro magnets and indicating mechanism controlled by said magnets, electric conductors connecting said sending instrument with said receiving instrument, and a repeating instrument for each receiving instrument and automatically operated by said electro magnets simultaneously with said indicating mechanism at the receiving instrument, and a common return conductor for both the receiving instruments and the repeating instruments connected to the other ship's main, substantially as described.

6. In a ship's telegraph system, the combination with a sending instrument comprising a keyboard and a plurality of electric circuits adapted to be closed thereby, a receiving instrument having a series of electro magnets with their windings connected to said sending instrument, indicating mechanism operated by said electro magnets, a repeating instrument electrically connected to the ship's main and to the receiving instrument, and a common return conductor, for both the receiving instrument and the repeating instrument, connected to the other ship's main, substantially as described.

7. In a ship's telegraph system, the combination of a keyboard sending instrument adapted to close any one of a plurality of electric circuits, of an electromagnetically operated receiving instrument responding to said sending instrument, and an electromagnetically operated repeating instrument electrically connected to and automatically operated by said receiving instrument, independently of the sending instrument, substantially as described.

8. In a ship's telegraph system, the combination of a keyboard sending instrument adapted to close any one of a series of electric circuits, a group of electromagnetically operated receiving instruments simultaneously operated by the circuits from said sending instrument, and an electromagnetically operated repeating instrument for each receiving instrument electrically connected to and automatically operated by said receiving instrument, independently of the sending instrument, substantially as described.

9. In a ship's telegraph system, the combination with a plurality of keyboard sending instruments, of a plurality of electromagnetically operated receiving instruments, electric circuits connecting said sending instruments to said receiving instruments either singly or in groups, and a series of electromagnetically operated repeating instruments electrically connected to their respective receiving instruments and automatically operated thereby, substantially as described.

10. In a ship's telegraph system, the combination with a sending instrument provided with a keyboard, of a plurality of receiving instruments provided with electro magnets and indicating mechanism controlled by said magnets, electric conductors connecting said sending instrument with said receiving instruments, a repeating instrument for each receiving instrument, a series of electric circuits connecting the receiving and repeating instruments automatically closed by said electro magnets at the receiving instrument, and electro magnets at the repeating instrument energized by the current from said circuits, with indicating mechanism similar to that at the receiving station, operated by said magnets at the repeating instrument, substantially as described.

11. In a ship's telegraph system, the combination with a sending instrument provided with a keyboard, of a plurality of receiving instruments provided with electro magnets and indicating mechanism controlled by said magnets, electric conductors connecting said sending instrument with said receiving instruments, a repeating instrument for each receiving instrument, a series of electric circuits connecting the receiving and repeating instruments automatically closed by said electro magnets at the receiving instrument, and electro magnets at the repeating instrument energized by the current from said circuits, with indicating mechanism similar to that at the receiving station, operated by said magnets at the repeating instrument, and a common return conductor for both the receiving instruments and the repeating instruments connected to the other ship's main, substantially as described.

12. In a ship's telegraph system, the combination with a sending instrument comprising a keyboard and a plurality of electric circuits adapted to be closed thereby, a receiving instrument having a series of electro magnets with their windings electrically connected to the keys of said sending instrument, indicating mechanism operated by said electro magnets, a repeating instrument of similar construction to the receiving instrument electrically connected to the ship's main and to the receiving instrument, and responding to the indications made by said receiving instrument, and a common return conductor, for both the receiving instrument and the repeating instrument, connected to the other ship's main, substantially as described.

13. In a ship's telegraph system, the combination of a sending instrument adapted to close any one of a series of electric circuits, a group of receiving instruments simultaneously operated by the circuits from said sending instrument, and a repeating instrument for each receiving instrument of similar construction to the receiving instrument, and in electrical connection with and automatically operated by said receiving instrument, independently of the sending instrument, substantially as described.

14. In a ship's telegraph system, the combination with a plurality of sending instruments, of a plurality of receiving instruments, electric circuits connecting said sending instruments to said receiving instruments either singly or in groups, and a series of repeating instruments each of similar construction with and electrically connected to their respective receiving instruments and automatically operated thereby, substantially as described.

15. In a ship's telegraph system, the combination of a keyboard sending instrument adapted to close any one of a plurality of electric circuits, of an electromagnetically operating receiving instrument responding to said sending instrument, comprising one or more series of graduated disks geared together, with means for rotating said disks in reverse directions, and an electromagnetically operated repeating instrument of similar construction to the receiving instrument and electrically connected to and automatically operated by said receiving instrument; substantially as described.

16. In a ship's telegraph system, the combination of a keyboard sending instrument adapted to close any one of a series of electric circuits, a group of electromagnetically operated receiving instruments simultaneously operated by the circuits from said sending instrument, each receiving instrument comprising one or more series of graduated disks geared together, with means for rotating said disks in reverse directions, and an electromagnetically operated repeating instrument for each receiving instrument of similar construction to the receiving instrument and electrically connected to and automatically operated by said receiving instrument, substantially as described.

17. In a telegraph apparatus of the character described, an indicator comprising a series of electro-magnets, a train of indicator wheels geared together to rotate at various relative speeds, mechanism operated by said electro-magnets for rotating said indicating wheels in reverse directions, means for locking said mechanism in the initial position and for automatically releasing said locking means when the magnets are energized, and means for energizing said magnets from a distance, substantially as described.

18. In a telegraph apparatus of the character described, an indicator comprising a series of electro-magnets, a train of indicator wheels geared together to rotate at various relative speeds, mechanism operated by said electro-magnets for rotating said indicating wheels in reverse directions, a spring latch normally locking the parts in the initial position, and means operated by said magnets for releasing said latch and then moving one or more of said indicator wheels, substantially as described.

19. In a telegraph apparatus of the character described, an indicator comprising a series of electro-magnets, a train of indicator wheels provided with differential teeth, with double star wheels engaging said teeth and causing said disks to rotate at various relative speeds, mechanism operated by said electro-magnets for rotating one of said indicating wheels in reverse directions, means for locking said mechanism in the initial position and for automatically releasing said locking means when the magnets are energized, and means for energizing said magnets from a distance, substantially as described.

20. In a telegraph apparatus of the character described, an indicator comprising a series of electro-magnets, a train of indicator wheels provided with differential teeth, with double star wheels engaging said teeth and causing said disks to rotate at various relative speeds, mehanism operated by said electro-magnets for rotating one of said indicating wheels in reverse directions, a spring latch normally locking the parts in the initial position, and means operated by said magnets for releasing said latch and then moving one or more of said indicator wheels, substantially as described.

21. In a telegraph apparatus of the character described, an indicator comprising a series of electro-magnets, a train of indicator wheels geared together to rotate at various relative speeds, a double ratchet and pawl arrangement operated by said electro-magnets for rotating said indicating wheels in reverse directions, means for locking said pawls in the initial position and for automatically releasing said locking means when the magnets are energized, and means for energizing said magnets from a distance, substantially as described.

22. In a telegraph apparatus of the character described, an indicator comprising a series of electro-magnets, a train of indicator wheels geared together to rotate at various relative speeds, a double ratchet and pawl arrangement operated by said electro-magnets for rotating said indicating wheels in reverse directions, a spring latch normally locking the parts in the initial position, and means also operated by said magnets for releasing said latch, substantially as described.

23. In a telegraph apparatus of the character described, an indicator comprising a series of electro-magnets, two trains of indicator disks provided with differential teeth, with double star wheels engaging said teeth and causing said disks to rotate at various relative speeds, mechanism operated by said electro-magnets for rotating one disk of each train of indicating wheels in reverse directions, a vibratory shutter operated by one of said indicator wheels, and means for energizing said magnets from a distance, substantially as described.

24. In a telegraph apparatus of the character described, an indicator comprising a series of electro-magnets, two trains of indicator disks provided with differential teeth, with double star wheels engaging said teeth and causing said disks to rotate at various relative speeds, mechanism operated by said electro-magnets for rotating one disk of each train of indicating disks in reverse directions, a vibratory shutter operated by one of said indicator wheels, means for locking said mechanism in the initial position and for automatically releasing said locking means when the magnets are energized, and means for energizing said magnets from a distance, substantially as described.

25. In a telegraph apparatus of the character described, an indicator comprising a series of electro-magnets, two trains of indicator disks provided with differential teeth, with double star wheels engaging said teeth and causing said disks to rotate at various relative speeds, mechanism operated by said electro-magnets for rotating one disk of each train of indicating disks in reverse directions, a vibratory shutter operated by one of said indicator wheels, a spring latch normally locking one member of said train in the initial position, and means operated by said magnets for releasing said latch and then moving one or more of said indicator wheels, substantially as described.

26. In a telegraph apparatus of the character described, an indicator comprising a series of electro-magnets, two trains of indicator wheels having the members of each geared together to rotate at various relative speeds, a double ratchet and pawl arrangement operated by said electro-magnets for rotating said indicating wheels in reverse directions, a vibratory shutter operated by one of said indicator wheels, and means for energizing said magnets from a distance, substantially as described.

27. In a telegraph apparatus of the character described, an indicator comprising a series of electro-magnets, two trains of indicator wheels having the members of each geared together to rotate at various relative speeds, a double ratchet and pawl arrangement operated by said electro-magnets for rotating said indicating wheels in reverse directions, a vibratory shutter operated by one of said indicator wheels, means for locking said pawls in the initial position and for automatically releasing said locking means when the magnets are energized, and means for energizing said magnets from a distance, substantially as described.

28. In a telegraph apparatus of the character described, an indicator comprising a series of electro-magnets, two trains of indicator wheels having the members of each geared together to rotate at various relative speeds, a double ratchet and pawl arrangement operated by said electro-magnets for rotating said indicating wheels in reverse directions, a vibratory shutter operated by one of said indicator wheels, a spring latch normally locking the pawls in the initial position, and means also operated by said magnets for releasing said latch, substantially as described.

29. In a ship's telegraph system, the combination of a sending instrument adapted to close any one of a plurality of electric circuits, of an electromagnetically operating receiving instrument responding to said sending instrument, comprising one or more series of graduated disks geared together with means for rotating said disks in reverse directions, an electromagnetically operated repeating instrument of similar construction to the receiving instrument and electrically connected to and automatically operated by said receiving instrument, with friction brakes adapted to lock each train of disks when the current is off, substantially as described.

30. In a ship's telegraph system, the combination of a sending instrument adapted to close any one of a plurality of electric circuits, of an electromagnetically operating receiving instrument responding to said sending instrument, comprising one or more series of graduated disks geared together with means for rotating said disks in reverse directions, an electromagnetically operated repeating instrument of similar construction to the receiving instrument and electrically connected to and automatically operated by said receiving instrument with friction brakes, comprising indented friction wheels and spring impressed rollers, adapted to lock each train of disks when the current is off, substantially as described.

31. In a ship's telegraph system, the combination of a keyboard sending instrument adapted to close any one of a series of electric circuits, a group of electromagnetically operated receiving instruments simultaneously operated by the circuits from said sending instrument, each receiving instrument comprising one or more series of graduated disks geared together with means for rotating said disks in reverse directions, and an electromagnetically operated repeating instrument for each receiving instrument of similar construction to the receiving instrument and electrically connected to and automatically operated by said receiving instrument, with friction brakes adapted to lock each train of disks when the current is off, substantially as described.

32. In a ship's telegraph system, the combination of a keyboard sending instrument adapted to close any one of a series of electric circuits, a group of electromagnetically operated receiving instruments simultaneously operated by the circuits from said sending instrument, each receiving instrument comprising one or more series of graduated disks geared together with means for rotating said disks in reverse directions, and an electromagnetically operated repeating instrument for each receiving instrument of similar construction to the receiving instrument and electrically connected to and automatically operated by said receiving instrument, with friction brakes, comprising indented friction wheels and spring impressed rollers, adapted to lock each train of disks when the current is off, substantially as described.

33. In a ship's telegraph system, the combination of a keyboard sending instrument adapted to close any one of a plurality of electric circuits, of an electromagnetically operating receiving instrument responding to said sending instrument, comprising two series of graduated disks, the members of each series being geared together, with means for rotating each of said series of disks in reverse directions, a vibratory shutter operated by one of said series of disks, and an electromagnetically operated repeating instrument of similar construction to the receiving instrument and electrically connected to and automatically operated by said receiving instrument, substantially as described.

34. In a ship's telegraph system, the combination of a keyboard sending instrument adapted to close any one of a series of electric circuits, a group of electromagnetically operated receiving instruments simultaneously operated by the circuits from said sending instrument, each receiving instrument comprising two series of graduated disks, the members of each series being geared together, with means for rotating each of said series of disks in reverse directions, a vibratory shutter operated by one of said series of disks, and an electromagnetically operated repeating instrument of similar construction to the receiving instrument and electrically connected to and automatically operated by said receiving instrument, substantially as described.

35. In a telegraph apparatus of the character described, the combination of a receiving and a repeating instrument electrically connected and each comprising a series of electro-magnets, a train of indicator disks provided with differential teeth, with double star wheels engaging said teeth and causing said disks to rotate at various relative speeds, and mechanism operated by said electro-magnets for rotating one of said indicating disks in reverse directions, a circuit closer at said receiving instrument for closing the circuit to the repeating instrument, means operated by said mechanism for rotating the indicating disks for operating said circuit closer, and means for energizing said magnets from a distance, substantially as described.

36. In a telegraph apparatus of the character described, the combination of a receiving and a repeating instrument electrically connected and each comprising a series of electro-magnets, a train of indicator disks provided with differential teeth, with double star wheels engaging said teeth and causing said disks to rotate at various relative speeds, and mechanism operated by said electro-magnets for rotating one of said indicating disks in reverse directions, a circuit closer at said receiving instrument for closing the circuit to the repeating instrument, means operated by said mechanism for rotating the indicating disks for operating said circuit closer, means for locking said mechanism in the initial position and for automatically releasing said locking means when the magnets are energized, and means for energizing said magnets from a distance, substantially as described.

37. In a telegraph apparatus of the character described, an indicator comprising a series of electro-magnets, two trains of indicator disks provided with differential teeth, with double star wheels engaging said teeth and causing said disks to rotate at various relative speeds, mechanism operated by said electro-magnets for rotating one disk of each train of indicating wheels in reverse directions, a vibratory shutter operated by one of said indicator wheels, yielding means for automatically locking each train of disks against turning when the current is off, and means for energizing said magnets from a distance, substantially as described.

38. In a telegraph apparatus of the character described, an indicator comprising a series of electro-magnets, two trains of indicator disks provided with differential teeth, with double star wheels engaging said teeth and causing said disks to rotate at various relative speeds, mechanism operated by said electro-magnets for rotating one disk of each train of indicating wheels in reverse directions, a vibratory shutter operated by one of said indicator wheels, yielding means for automatically locking each train of disks against turning when the current is off, comprising a dentated friction wheel rigidly connected to the first disk of the series, and a spring impressed roller engaging said wheel, and means for energizing said magnets from a distance, substantially as described.

39. In a telegraph apparatus of the character described, an indicator comprising a series of electro-magnets, two trains of indicator disks provided with differential teeth, with double star wheels engaging said teeth and causing said disks to rotate at various relative speeds, mechanism operated by said electro-magnets for rotating one disk of each train of indicating disks in reverse directions, yielding means for automatically locking each train of disks against turning when the current is off, and means for energizing said magnets from a distance, substantially as described.

40. In a telegraph apparatus of the character described, an indicator comprising a series of electro-magnets, two trains of indicator disks provided with differential teeth, with double star wheels engaging said teeth and causing said disks to rotate at various relative speeds, mechanism operated by said electro-magnets for rotating one disk of each train of indicating disks in reverse directions, yielding means for automatically locking each train of disks against turning when the current is off, comprising a dentated friction wheel rigidly connected to the first disk of the series, and a spring impressed roller engaging said wheel, and means for energizing said magnets from a distance, substantially as described.

41. In an apparatus of the character described, the combination with a fixed shaft, and a plurality of indicating disks mounted on said shaft, with gearing connecting said disks and causing them to move with predetermined varying velocities, of means for imparting motion to the train of disks, comprising a toothed wheel mounted on said shaft and connected to the first disk of the series, an arm pivoted on said shaft, a pawl pivoted to said arm and adapted to engage said toothed wheel, a reciprocating rod adapted to rock said pawl about its pivot, and electromagnetic means for reciprocating said rod, substantially as described.

42. In an apparatus of the character described, the combination with a fixed shaft, and a plurality of indicating disks mounted on said shaft, with gearing connecting said disks and causing them to move with predetermined varying velocities, of means for imparting motion to the train of disks, comprising a toothed wheel mounted on said shaft and connected to the first disk of the series, an arm pivoted on said shaft, a bell crank pawl pivoted to said arm and adapted to engage said toothed wheel, a spring latch carried by said arm and adapted to lock the same normally in the off position, a link connecting said latch and said pawl and adapted to withdraw said latch when said pawl is rocked to the engaging position, a reciprocating rod pivoted to said pawl and adapted to rock said pawl into and out of engagement with said tooth, and electromagnetic means for reciprocating said rod, substantially as described.

43. In an apparatus of the character described, the combination with a fixed shaft, and a plurality of indicating disks mounted on said shaft, with gearing connecting said disks and causing them to move with predetermined varying velocities, of means for imparting motion to the train of disks, comprising a toothed wheel mounted on said shaft and connected to the first disk of the series, an arm pivoted on said shaft, a pawl pivoted to said arm and adapted to engage said toothed wheel, a reciprocating rod adapted to rock said pawl about its pivot, a dentated friction wheel also connected to said toothed wheel, a spring impressed roller engaging said friction wheel, and electromagnetic means for reciprocating said rod, substantially as described.

44. In an apparatus of the character described, the combination with a fixed shaft, and a plurality of indicating disks mounted on said shaft, with gearing connecting said disks and causing them to move with predetermined varying velocities, of means for imparting motion to the train of disks, comprising a toothed wheel mounted on said shaft and connected to the first disk of the series, an arm pivoted on said shaft, a bell crank pawl pivoted to said arm and adapted to engage said toothed wheel, a spring latch carried by said arm and adapted to lock the same normally in the off position, a link connecting said latch and said pawl and adapted to withdraw said latch when said pawl is rocked to the engaging position, a reciprocating rod pivoted to said pawl and adapted to rock said pawl into and out of engagement with said tooth, a dentated friction wheel also connected to said toothed wheel, a spring impressed roller engaging said friction wheel, and electromagnetic means for reciprocating said rod, substantially as described.

45. In an apparatus of the character described, the combination with a receiving instrument comprising a fixed shaft, and a plurality of indicating disks mounted on said shaft, with gearing connecting said disks and causing them to move with predetermined varying velocities, with means for imparting motion to the train of disks, comprising a toothed wheel mounted on said shaft and connected to the first disk of the series, an arm pivoted on said shaft, a pawl pivoted to said arm and adapted to engage said toothed wheel, a reciprocating rod adapted to rock said pawl about its pivot, a circuit closer also operated by said pawl, and electromagnetic means for reciprocating said rod, of a repeating instrument similar to the receiving instrument and having its electric circuit closed by said circuit closer, substantially as described.

46. In an apparatus of the character described, the combination with a receiving instrument comprising a fixed shaft, and a plurality of indicating disks mounted on said shaft, with gearing connecting said disks and causing them to move with predetermined varying velocities, with means for imparting motion to the train of disks, a toothed wheel mounted on said shaft and connected to the first disk of the series, an arm pivoted on said shaft, a bell crank pawl pivoted to said arm and adapted to engage said toothed wheel, a spring latch carried by said arm and adapted to lock the same normally in the off position, a link connecting said latch and said pawl and adapted to withdraw said latch when said pawl is rocked to the engaging position, a reciprocating rod pivoted to said pawl and adapted to rock said pawl into and out of engagement with said tooth, a circuit closer also operated by said pawl, and electromagnetic means for reciprocating said rod, of a repeating instrument similar to the receiving instrument and having its electric circuit closed by said circuit closer, substantially as described.

47. In an apparatus of the character described, the combination with a fixed shaft, and a plurality of indicating disks mounted on said shaft, with gearing connecting said disks and causing them to move with predetermined varying velocities, of means for imparting motion to the train of disks in reverse directions, comprising a toothed wheel mounted on said shaft and connected to the first disk of the series, two oppositely disposed arms pivoted on said shaft, a pawl pivoted to each arm and adapted to engage said toothed wheel, a reciprocating rod adapted to rock said pawl about its pivot, and electromagnetic means for reciprocating said rod, substantially as described.

48. In an apparatus of the character described, the combination with a fixed shaft, and a plurality of indicating disks mounted on said shaft, with gearing connecting said disks and causing them to move with predetermined varying velocities, of means for imparting motion to the train of disks in reverse directions, comprising a toothed wheel mounted on said shaft and connected to the first disk of the series, two oppositely disposed arms pivoted on said shaft, a bell crank pawl pivoted to each arm and adapted to engage said toothed wheel, a spring latch carried by each arm and adapted to lock the same normally in the off position, a link connecting said latch and said pawl and adapted to withdraw said latch when said pawl is rocked to the engaging position, a reciprocating rod pivoted to said pawl and adapted to rock said pawl into and out of engagement with said tooth, and electromagnetic means for reciprocating said rod, substantially as described.

49. In an apparatus of the character described, the combination with a fixed shaft, and a plurality of indicating disks mounted on said shaft, with gearing connecting said disks and causing them to move with predetermined varying velocities, of means for imparting motion to the train of disks in reverse directions, comprising a toothed wheel mounted on said shaft and connected to the first disk of the series, two oppositely disposed arms pivoted on said shaft, a pawl pivoted to each arm and adapted to engage said toothed wheel, a reciprocating rod adapted to rock said pawl about its pivot, a dentated friction wheel also connected to said toothed wheel, a spring impressed roller engaging said friction wheel, and electromagnetic means for reciprocating said rod, substantially as described.

50. In an apparatus of the character described, the combination with a fixed shaft, and a plurality of indicating disks mounted on said shaft, with gearing connecting said disks and causing them to move with predetermined varying velocities, of means for imparting motion to the train of disks in reverse directions, comprising a toothed wheel mounted on said shaft and connected to the first disk of the series, two oppositely disposed arms pivoted on said shaft, a bell crank pawl pivoted to each arm and adapted to engage said toothed wheel, a spring latch carried by said arm and adapted to lock the same normally in the off position, a link connecting said latch and said pawl and adapted to withdraw said latch when said pawl is rocked to the engaging position, a reciprocating rod pivoted to said pawl and adapted to rock said pawl into and out of engagement with said teeth, a dentated friction wheel also connected to said toothed wheel, a spring impressed roller engaging said friction wheel, and electromagnetic means for reciprocating said rod, substantially as described.

In testimony whereof, I affix my signature, in presence of two witnesses.

RICHARD D. WHITE.

Witnesses:
W. MAX DUVALL,
GEO. L. CARY.